United States Patent
Hvarre

(10) Patent No.: US 6,858,149 B2
(45) Date of Patent: Feb. 22, 2005

(54) METHOD FOR THE TREATMENT OF TAP WATER AND DRINKING WATER

(75) Inventor: John Nikolaj Hvarre, 6, Granledet, Lellinge, DK-4600 Køge (DK)

(73) Assignee: John Nikolaj Hvarre, Koge (DK)

( * ) Notice: Subject to any disclaimer, the term of this patent is extended or adjusted under 35 U.S.C. 154(b) by 63 days.

(21) Appl. No.: 10/722,924

(22) Filed: Nov. 24, 2003

(65) Prior Publication Data

US 2004/0104176 A1 Jun. 3, 2004

Related U.S. Application Data

(62) Division of application No. 09/769,899, filed on Jan. 25, 2001, now Pat. No. 6,652,747.

(30) Foreign Application Priority Data

Jul. 27, 1998 (DK) .......................................... 1998 00976
Jul. 27, 1998 (DK) .......................................... 1998 00975

(51) Int. Cl.$^7$ ................................................ C02E 1/48
(52) U.S. Cl. ..................... 210/695; 210/222; 210/257.1
(58) Field of Search ................................ 210/695, 222, 210/257.1

(56) References Cited

U.S. PATENT DOCUMENTS

| | | | | |
|---|---|---|---|---|
| 3,884,823 A | * | 5/1975 | Clendenen et al. ...... | 252/62.63 |
| 4,062,922 A | * | 12/1977 | Olson et al. ................. | 264/294 |
| 4,734,202 A | * | 3/1988 | Mach .......................... | 210/695 |
| 5,269,915 A | * | 12/1993 | Clair ........................... | 210/222 |
| 5,932,108 A | * | 8/1999 | Brunsting ................... | 210/695 |
| 6,126,835 A | * | 10/2000 | Barbera-Guillem et al. | 210/695 |

FOREIGN PATENT DOCUMENTS

| | | |
|---|---|---|
| DE | 296 20 917 U1 | 12/1996 |
| DE | 297 03 480 U1 | 2/1997 |
| DK | 105349 | 12/1966 |
| EP | 0 502 890 B1 | 9/1994 |
| GB | 2 257 932 A | 1/1993 |

OTHER PUBLICATIONS

Kirk–Othmer, Encyclopedia of Chemical Technology, 4th ed., vol. 15, "Laser to Mass Spectrometry".

Sumitomo Special Metals Company, excerpts from company internet site (2 pages).

* cited by examiner

*Primary Examiner*—Ana Fortuna
(74) *Attorney, Agent, or Firm*—Anderson Kill & Olick, P.C.; Eugene Lieberstein; Michael N. Meller

(57) ABSTRACT

A method is provided for the treatment of water so as to reduce or destroy micro-organisms therein as well as other causes of skin diseases or waterborne diseases in human beings and animals, wherein the water is passed through a magnetic field being presented by a permanent magnet showing an energy product $(BH)_{max}$ of more than 20 kJ/m$^3$ to which the water is exposed and a coercive force Hc of more than of about 200 kA/m at 25° C.

8 Claims, No Drawings

METHOD FOR THE TREATMENT OF TAP WATER AND DRINKING WATER

This is a divisional application of U.S. patent application Ser. No. 09/769,899 in the name of HVARRE filed on Jan. 25, 2001 now U.S. Pat. No. 6,652,747.

FIELD OF THE INVENTION

The present invention relates to a method for the treatment of tap water and drinking water so as to reduce or destroy viable micro-organisms as well as causes of skin diseases and waterborne diseases in the water affecting or human beings and animals.

BACKGROUND OF THE INVENTION

The closest prior art is described in EP-PS No. 0,502,890 B1 which describes a mouthpiece for a water tapping point. This mouthpiece comprises a flow modifying element which is made wholly or partly of a magnetic material, such as a magnetizable ceramic material. It is known from this EP Patent Specification that the use of such a magnetic flow modifying element renders it possible to change the crystal form of calcium carbonate precipitated in water from the aragonite form into the calcite form with the result that the calcium carbonate is not left as deposits in or at the mouthpiece. Apart from this effect on the tendency of the water to deposit calcium carbonate as incrustations, no further results are known of the processing of water in accordance with this known technique.

GB 2,257,932 A discloses furthermore a magnetic water conditioning device comprising a pair of arc or semicircular magnets to be placed externally on a copper or plastic pipe containing water. These magnets are magnetized radially and are designed to prevent the water from forming scale. The arc or semicircular magnets are made of strontium ferrite.

WO-97/44810 A1 discloses a method of improving skin condition by administering to the skin substrates, such as aqueous salt solutions, massage oils or other pharmaceutically acceptable carriers which have been exposed to information energy, such as oscillation patterns modelled after those found in natural herbs. A magnetic vector potential field is in accordance with the description generated by two opposing sets of magnets, where each set of magnets comprises a number of magnets arranged side by side with alternating N and S poles. The substrate to be used for improving the skin condition is arranged between the opposing sets of magnets.

DE 2,970,380 U1 discloses an energetic water processing apparatus for preventing calcareous and corrosion deposits in pipes and for destroying the growth conditions for bacterial colonies. The energetic water processing implies that the water is subjected both to a magnetic and to an electric field.

Finally, DE 2,648,232 A1 discloses a permanent magnetic system having an effect on biological processes. The apparatus comprises an axially magnetized, annular permanent magnet with a concentrically arranged centre pole. The permanent magnetic ring is made of anisotropic barium or strontium ferrite. The apparatus is for instance used for treatment of an inflammatory area; orientation of cell growth in connection with healing of wounds; orientation of growth of seedlings; separation of leucocytes and erythrocytes; effecting bacterial cultures etc.

None of the above references describe or indicate a simple device and a method for the treatment of tap water and drinking water so as to reduce or remove the amount of micro-organisms therein as well as possible other causes of skin diseases or waterborne diseases in human beings and animals.

Many human beings and animals suffer from skin diseases or waterborne diseases which are caused or aggravated by the use of water for drinking or for use in the household or water for the personal hygiene in form of washing and bathing.

It is well-known that water for drinking or for use in the household or for the personal hygiene can sometimes contain a variety of micro-organisms which may cause various infectious diseases. Examples of such diseases are various types of dysentery, typhoid, cholera and Legionnaires' disease.

It is also known that water can be a contributing cause of various skin diseases including eczema and dermatitis. The reason for this is still unknown, but it seems to be multifactoriel. *Thermophilous* bacteria thriving in hot water systems are likely to play an important role in the development of such diseases.

BRIEF DESCRIPTION OF THE INVENTION

The object of the invention is thus to provide a method for the treatment of tap water and drinking water so as to reduce or destroy micro-organisms therein as well as other causes of skin diseases or waterborne diseases affecting human beings and animals.

Surprisingly, it has now been found that this object according to the invention can be solved by providing a device which is characterised by comprising at least one permanent magnet provided with an axially extending opening, said magnet subjecting passing water to a magnetic field and being made of a magnetic material which presents an energy product $(BH)_{max}$ of more than approximately 20, and preferably more than approximately 40 $kJ/M^3$, and a coercive force Hc of preferably more than approximately 200 kA/m at 25° C., the north pole of said magnet being positioned at one axial end face and the south pole being positioned at the opposite axial end face, and said water passing through the axially extending opening in the magnet.

The method according to the invention is characterised by the water passing a device according to the invention immediately before or adjacent a tapping point.

As a result, skin diseases turned out not only to be relieved, but the symptoms can disappear completely as long as the patient uses water being treated by means of a device according to the invention immediately before or adjacent the tapping point. When the patient ceases to use water having been treated by the method according to the invention, the skin disease often breaks out again.

In addition, it turned out that micro-organisms, such as bacteria, fungi, protozoes and flagellates disappear or that the number thereof is reduced. As a result, the risk of contracting diseases due to the content of such micro-organisms in the water disappears too or is reduced.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

The magnet in the device according to the invention is preferably annular and is preferably of an external diameter in the range of from approximately 10 to approximately 20 mm and a diameter of the opening in the range of from approximately 3 to approximately 7 mm. Furthermore, the magnet in the device according to the invention is preferably of a length in the range of from approximately 7 to approximately 15 mm.

A magnet meeting the requirements presented to the use in the device according to the invention is a ceramic magnet made of strontium-ferrite with a permanent remanence of preferably at least 0.38 Weber/$m^2$.

The device according to the invention can, if desired, comprise a number of permnanent magnets arranged in extension of one another in the longitudinal direction, where said magnets are preferably arranged such that the poles at abutting magnet end faces repel one another. Thus the openings extending in the individual magnets form together an axially extending passageway for the water.

Like the prior art of EP-PS No. 0,502,890 B1, the device according to the invention can be used wherever tap water and drinking water are tapped, the subject matter of said prior art being incorporated in the present description by way of reference. Examples of the use of the device according to the invention are for instance water tapping points, showers, shower pipes, mixing taps, tapping points for drinking water dispensers etc.

Examples of skin diseases or waterborne diseases developed or maintained by the use of tap water or drinking water are for instance eczema, dermatitis, psoriasis, leg sores, prurigo, pruritus, urticaria and dandruff, diarrhea, catarrhal infection in the gastrointestinal tract, dysentery, typhoid fever, cholera, legionellosis, leptospirosis and ulcer. The micro-organisms causing these diseases are:

Bacteria including *thermophilous* bacteria, *coli* bacteria, *shigella* bacteria, *vibrio* bacteria, *legionella* bacteria, *campylobacter* bacteria, *salmonella* bacteria, *helicobacter* bacteria and *pseudomonas* bacteria, fungi, including yeast fungi and mould fungi, protozos, including *Entamoeba histolytica* and *Cryptosporidium* as well as flagellates, such as *Giardia lamblia*.

In addition, the water treated by the method according to the invention appears to have a strengthening effect on the immune defence of the skin.

Without being committed to the theory it is assumed that the surprising result obtained by the device and the method according to the invention is due to a degradation of the micro-organisms which as electrically charged particles in a fast, turbulent water flow are subjected to a strong magnetic field generated by the use of magnetic material with an energy product which is far higher than the energy product of the magnetic materials used in the closest prior art. In addition, the coercive force presented by the magnetic materials used in the device and the method according to the invention is significantly higher than the coercive force of the magnetic materials used in the closest prior art. As described in greater detail below, it has been demonstrated that the number of micro-organisms drops significantly by treating the water in the device and by the method according to the invention.

The water treated by the method according to the invention has been subjected to clinical tests in connection with skin diseases. The clinical tests have been performed at Marselisborg Hospital, Aarhus, Denmark. The clinical tests revealed that approximately 33% of the patients were cured by the use of bathing water treated by the method according to the invention.

The invention is illustrated in greater detail below by the following Examples, which are not intended to limit the spirit and scope of the invention.

EXAMPLE 1

Endotoxines in Drinking Water with and without the use of the Device According to the Invention.

The determination of endotoxines was performed on samples of water tapped from the same tap in a block of flats. The water was tapped from the tap both after passing through a ceramic magnet of strontium-ferrite with an energy product of approximately 25.6 kJ/$m^3$, a coercive force of approximately 250 kA/m and a remanent magnetization of 0.38 Weber/$m^2$ (permanent induction) and without passing through such a magnet. The magnet has an external diameter of 12 mm, an axially extending opening of a diameter of 5 mm and a length of 10 mm. The tap was a hot tap connected through a piping arrangement to a hot-water tank common to the entire block of flats. The water samples were sampled by the following method. The tap was not used for 12 hours, and the water was allowed to run for 30 seconds before a first sample was removed. After running for 7 minutes, a second sample was removed. As illustrated in Table 1 below, test 1 and test 2 with a magnet revealed significantly better results than test 3 and test 4, respectively, without a magnet. A test with a tap known from the prior art, cf. EP-PS No. 0,502,890 B1, having an energy product of 19.1 kJ/$m^3$, a coercive force of 223 kA/m and a permanent induction of 0.33 Weber/$m^2$, revealed unexpectedly a result corresponding to the results of test No. 3 and test No. 4 in connection with the determination of endotoxine.

TABLE 1

| Test No. | Water temperature ° C. | Removal of samples | EU/ml* |
| --- | --- | --- | --- |
| 1 with/magnet | 40 | after 30 sec. | 6.2 |
| 2 with/magnet | 47 | after 7 min | 4.2 |
| 3 without/magnet | 40 | after 30 sec. | 9.8 |
| 4 without/magnet | 47 | after 7 min | 4.6 |

*Determination of endotoxine in endotoxine units per ml according to Purified water in USP.

EXAMPLE 2

Comparison tests in order to determine the number of bacterial germs in water.

Like in Example 1 hot water for consumption is tapped from a tap in a block of flats. The results appear from Table 2. As illustrated in test No. 5, the number of bacterial germs in connection with the tapping of hot water at 37° C. is almost 8 times lower by the use of the device according to the invention than by a device without a magnet (test 6). Like in Example 1, no significant difference is obtained by the magnet treatment according to the prior art with respect to the number of germs compared to test No. 6.

TABLE 2

| Test No. | Water temperature ° C. | Bacteria/ml* |
| --- | --- | --- |
| 5 with/magnet | 37 | 700 |
| 6 without/magnet | 37 | 5500 |

*Determination according to Danish Standard draft, 1996.

EXAMPLE 3

The use of water tapped from a tap after passing through a ceramic magnet of strontium-ferrite with an energy product of approximately 25.6 kJ/m³, a coercive force of approximately 250 kA/m and a remanent magnetization of 0.38 Weber/m² as well as with an external diameter of 12 mm, an axially extending opening of a diameter of 5 mm and a length of 10 mm.

A device used according to the invention with the above specifications was installed at the house of an adult female patient suffering for a number of years of eczema on her hands, and who had to wash her hands continuously due to her work as a medical doctor.

After a week's use of the device according to the invention for the washing of her hands, all the eczema on her hands was gone, and since then the patient has not suffered from eczema on her hands.

EXAMPLE 4

The use of water tapped from a tap after passing through a ceramic magnet of strontium-ferrite with an energy product of approximately 25.6 kJ/m³, a coercive force of approximately 250 kA/m and a remanent magnetizing of 0.38 Weber/m² as well as with an external diameter of 12 mm, an axially extending opening of a diameter of 5 mm and a length of 10 mm.

A device used according to the invention with the above specifications was installed at the house of a young male patient suffering from a strong, atopic dermatitis. The symptoms of the patient on his hands were improved significantly.

EXAMPLE 5

The use of water having passed through three magnets of strontium-ferrite with an energy product of approximately 25.6 kJ/m³, a coercive force of approximately 250 kA/m and a remanent magnetization of 0.38 Weber/m², and where each magnet had an external diameter of 12 mm, an internal diameter of the axially extending opening of 5 mm and a length of 10 mm and arranged in extension of one another in the longitudinal direction with abutting end faces with mutually repelling poles.

A device used according to the invention with the above specifications was installed in the shower head of the shower at the house of an adult male patient suffering from a strong erythema and itching of the skin after bathing. Subsequently, the malaise associated with the bathing disappeared immediately.

EXAMPLE 6

NdFeB-magnets showing an energy product (BH)max of approximately 250 kJ/m3, a coercive force, Hc, of approximately 850 kA/m and a residual magnetism of approximately 1.15 Weber/m2, were used for the following clinical tests.

The tests were carried out at the Dermatological Department of Marselisborg Hospital. The tests were carried out according to a protocol with cross-over for a period of 2×3 months.

The test persons had the following diagnoses:

infantile eczema, psoriasis and pruritus.

The symptom categories of the test were:

itching, burning pain, erythema, blisters, squamation and cracking.

The symptom score is calculated individually.

Result:

| Variable | Effect | Chi square test | P-value |
| --- | --- | --- | --- |
| Itching | Period | 0.4770 | 0.4898 |
|  | Treatment | 3.6810 | 0.0550 |
| Burning pain | Period | 22.8076 | 0.001 |
|  | Treatment | 56.0199 | 0.001 |
| Erythema | Period | 118.6522 | 0.001 |
|  | Treatment | 13.5347 | 0.002 |
| Blisters | Period | 8.07 | 0.0045 |
|  | Treatment | 13.16 | 0.0003 |
| Squamation | Period | 0.63 | 0.4269 |
|  | Treatment | 0.34 | 0.5545 |
| Cracking | Period | 0.2093 | 0.6473 |
|  | Treatment | 2.9561 | 0.0856 |

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

What is claimed is:

1. A method of treating tap water and/or drinking water so as to reduce or destroy micro-organisms therein as well as other causes of skin diseases or waterborne diseases in human beings and animals, wherein the water is passed through a device comprising a conduit for transporting said water composed of a magnetic material integral therein so as to form at least one permanent magnet internal of the conduit, said conduit being provided with an axially extending opening through which the water to be treated is to pass, with the magnetic material composition being such that generates an energy product (BH)max of more than 20 KJ/M3, and a coercive force Hc of more than about 200 KA/m at 25 C, to which water is exposed for reducing and destroying viable micro-organisms and other causes of skin diseases or waterborne diseases in said water, wherein the north pole of said magnet being positioned at one axial end face of the magnet, and the other end the south pole positioned at the opposite axial end face.

2. A method as claimed in claim 1, wherein said conduit is annular.

3. A method as claimed in claim 2, wherein said conduit has an external diameter in the range of from 10 to 20 mm, and wherein the axial opening is of a diameter in the range of from 3 to 7 mm.

4. A method as claimed in claim 2, wherein said permanent magnet in said conduit is of a length in the range of from 7 to 15 mm.

5. A method as claimed in claim 1, wherein said magnetic material is a ceramic composed of strontium-ferrite, and said magnet provides a permanent induction of at least 0.38 Weber/m².

6. A method as claimed in claim 1, wherein at least two permanent magnets are formed in the conduit arranged in tandem relative to one another in the longitudinal direction such that the poles of the magnets at abutting end faces repel one another.

7. A method as claimed in claim 1, wherein said magnet in the conduit is located at a water tapping point selected from the group consisting of a water tap, a shower, a shower pipe, a mixing tap or a tapping point for a drinking water dispenser.

8. A method as claimed in claim 1, wherein the micro-organisms and other causes of skin diseases or waterborne diseases to be reduced or destroyed include bacteria selected from the class consisting of *thermophilous* bacteria, *coli* bacteria, *shigella* bacteria, *vibrio* bacteria, *legionella* bacteria, *campylobacter* bacteria, *salmonella* bacteria, *helicobacter* bacteria and *pseudomonas* bacteria; fungi, including yeast fungi and mould fungi, protozoans, including *Entamoeba histolytica* and *Cryptosporidium,* and flagellates, including *Giardia lamblia.*

* * * * *